UNITED STATES PATENT OFFICE.

THEODOR CURTIUS, OF ERLANGEN, GERMANY.

HYDRAZIN.

SPECIFICATION forming part of Letters Patent No. 422,334, dated February 25, 1890.

Application filed June 6, 1889. Serial No. 313,364. (Specimens.)

*To all whom it may concern:*

Be it known that I, THEODOR CURTIUS, doctor of philosophy, a citizen of the Empire of Germany, residing at Erlangen, in the Empire of Germany, have invented certain new and useful Improvements in the Production of Hydrazin; and I do hereby declare the following to be a full, clear, and exact description of the invention, such as will enable others skilled in the art to which it appertains to make and use the same.

My invention relates to the production of a hydrazin which is to be used in medicine as medicament and as raw material for the production of antipyretics, and, further, in photography and analytic chemical processes as a reducing agent.

In carrying out my invention I proceed as follows: From the chlorhydrate of glycocoll ether $HClNH_2CH_2CO_2R$ is produced, by means of nitrite of sodium, in aqueous solution, the diazo-acetic ether $N_2CHCO_2R$. This diazo-acetic ether is converted, by heating with concentrated alkaline lye, into the triazo acetate $C_3H_3N_6(COOR)_3$. This latter body, on being boiled with acids, splits up into oxalic acid and the salt of hydrazin—for example, boiled with sulphuric acid according to the equation
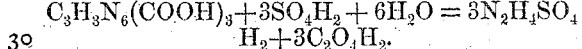

The salts of the hydrazin boiled with caustic potassium furnish the hydrate of the hydrazin $N_2H_4H_2O$. This body is in form of a colorless liquid, boiling (boiling-point 119°) undecomposed, fuming on contact with the air, and having prominent reducing qualities. By the action of metallic sodium the hydrazin $N_2H_4$ is set free from its hydrate in form of a gas.

The hydrazin of this application has not been described in any publication now in print, and it contains no carbon.

The hydrazin (diamidogen) described in the Journal of the Chemical Society, Volume LII, 1887, (abstracts,) is not to be confounded with the phenyl hydrazin, which is often called "hydrazin" for short. The body is in fact derived from hydrogen and nitrogen. The relations it bears to the hydrazin bases are the same as those existing between ammonia and amine bases. Like ammonia, it is a compound-radical which has been produced in a pure state and examined in the form of its salts. It is a clearly-defined chemical body.

What I claim as new, and wish to secure by Letters Patent, is—

The new product described, expressed by the formula $N_2H_4$, having prominent reducing qualities, the same being in the form of a gas which is set free from its hydrate by the action of metallic sodium.

In testimony whereof I affix my signature in presence of two witnesses.

THEODOR CURTIUS.

Witnesses:
JOSEPH REVERDY,
HEINRICH HAHN.